United States Patent [19]

Kelsall

[11] Patent Number: 4,655,422

[45] Date of Patent: Apr. 7, 1987

[54] THERMALLY PROTECTED LAMP HOLDER HOUSING FOR USE IN RECESS LIGHTING FIXTURES

[75] Inventor: Jeffrey C. Kelsall, Roselle, Ill.

[73] Assignee: Cooper Industries, Houston, Tex.

[21] Appl. No.: 782,844

[22] Filed: Oct. 1, 1985

[51] Int. Cl.$^{4}$ .............................................. F16L 5/00

[52] U.S. Cl. ........................................ 248/56; 24/459; 174/65 R; 248/316.1

[58] Field of Search .................... 248/56, 65, 73, 74.2, 248/313, 316, 316.8, DIG. 6; 24/459; 174/65 R; 285/128, 129; 362/396

[56] References Cited

U.S. PATENT DOCUMENTS

| | | | |
|---|---|---|---|
| 3,240,502 | 3/1966 | Snyder | 248/56 X |
| 4,002,822 | 1/1977 | Kurosaki | 248/56 X |
| 4,407,042 | 10/1983 | Schramme et al. | 248/56 X |
| 4,408,924 | 10/1983 | Huebner | 24/459 X |
| 4,517,408 | 5/1985 | Pegram | 248/56 X |

*Primary Examiner*—Ramon O. Ramirez

*Attorney, Agent, or Firm*—E. E. Scott; A. R. Thiele

[57] ABSTRACT

A housing for holding a lamp socket for use in a recessed lighting fixture includes a bracket member and a mounting flange for both mounting a thermal protective device within the housing and for clamping electrical conduit to the housing. The L-shaped bracket member mounts to the housing at an access hole to clamp the conduit against the mounting flange on the housing and position the thermal protective device in close proximity to the interior wall of the housing.

15 Claims, 8 Drawing Figures

THERMALLY PROTECTED LAMP HOLDER HOUSING FOR USE IN RECESS LIGHTING FIXTURES

BACKGROUND OF THE INVENTION

This invention relates to lamp holder housings. More particularly, this invention relates to lamp holder housings for use in recessed lighting fixtures and, in still greater particularity, this invention relates to a lamp holder housing including an arrangement for mounting both flexible conduit to the lamp holder housing and a thermal protective device within the interior of the lamp holder housing.

Heretofore, electrical conduit has been mounted to enclosures such as lamp holder housings with multi-piece connectors such as threaded male and female members specifically adapted to be inserted and retained within an access opening in the enclosure or housing. These connectors are typically provided with mechanical means for attachment to the conduit. Such mechanical means typically include hardware such as set screws, saddle type clamps and friction or compression type systems all configured for grasping the exterior of the conduit.

It has also been a practice in the field to provide protection against overheating for the surrounding structure. This protection is normally accomplished by including thermal sensors and switch assemblies within the lamp holder housing or adjacent to its exterior. These thermal sensors and switches open the electrical circuit which provides power to the lamp when excessive heat is detected. One of the most desirable locations for sensing heat is between the light source and the closed end of the housing. It is in this area that heat builds up and causes a potential hazard. Heretofore, special access holes, mounting brackets or hardware for securing the thermal protective device within the housing have been required to obtain this most desirable positioning of the thermal sensor.

SUMMARY OF THE INVENTION

The present invention provides a lamp holder housing having a simplified arrangement for mounting both an electrical conduit to the housing and a thermal protective device within the interior of the housing.

According to an important aspect of the invention, the lamp holder housing itself is provided with an access opening and a flange projecting from its sidewall configured to receive one end of a flexible electrical conduit. The flange defines one portion of a clamp for securing the conduit to the lamp holder housing.

There is also provided a bracket member adapted to both fit within the access opening and interact with the flange to define the second portion of the aforementioned clamp. Specifically, the bracket member has one leg configured to be compatible with the flange to engage an end of the flexible conduit and a second leg which extends into the interior of the housing in a spaced apart relationship with the inner surface of the housing sidewall. Provided on the second leg of the bracket is a mounting for a thermal protective device configured to place the thermal protective device in close proximity to the housing sidewall.

The invention further provides for a spring clip adapted to be received in a cut-out portion of the bracket member. The spring clip engages the thermal protective device to removably mount the protective device to the bracket member.

According to another important feature of the invention, the bracket member is shaped like an upside-down L to define an elongated, raised, flange-like portion at the junction of its horizontal and vertical legs. The raised portion abuts an edge of the access opening the closed end of the housing.

A still further important feature of the invention provides for a shoulder on the bracket member defined by the raised, flange-like portion and vertical leg of the bracket member. The shoulder is received against an inner surface of the closed end of the housing.

A still further important feature of the invention provides for a pair of raised projections on the flange and horizontal leg of the bracket member which are oriented and sized to threadably receive the external thread configuration of a BX type flexible conduit.

Another feature of the invention provides for a threaded fastener for holding the bracket member to the flange to clamp the conduit between the flange and bracket.

BRIEF DESCRIPTION OF THE DRAWINGS

These and other features of the invention will become better understood after a reading of the following detailed description of the preferred embodiment taken in conjunction with the drawings wherein.

DETAILED DESCRIPTION OF THE PREFERRED EMBODIMENT

Figure 1:
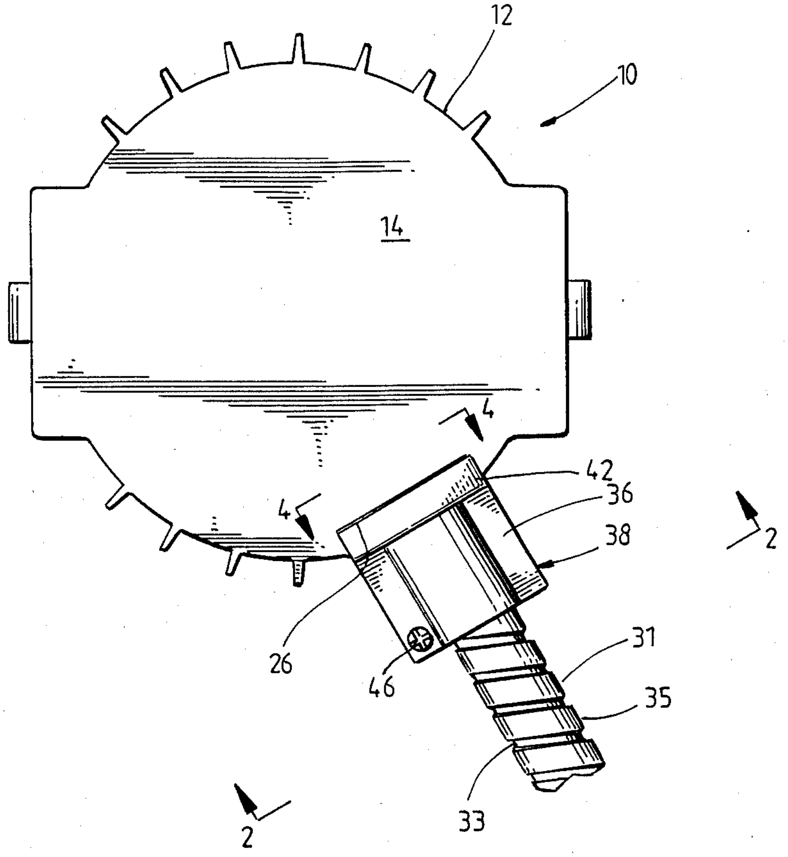
FIG. 1 is a top plan view of a lamp holder housing embodying the teachings of the present invention.
Figure 2:
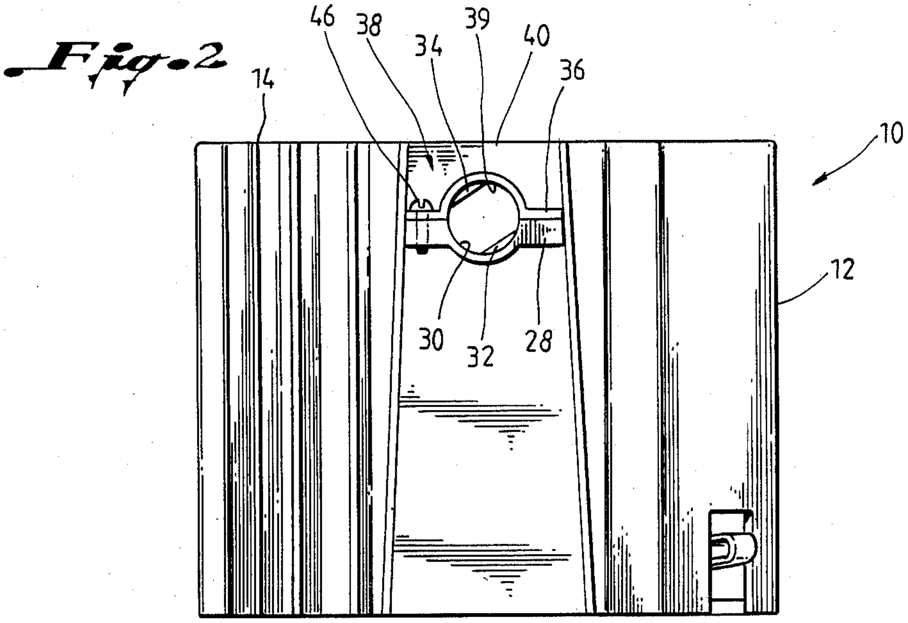
FIG. 2 is a side elevational view looking from imaginary line 2—2 of FIG. 1.

Shown in FIGS. 1 and 2 is lamp holder housing 10 including a generally cup-shaped body having peripheral sidewall 12, closed end 14 and an open end 15. An electrical socket 16 (FIG. 5) is mounted within interior 15 of housing 10 against interior surface 13 of closed end 14. Housing 10 is of the type generally used in a recessed lighting fixture, the specific structure and features of which do not constitute part of the present invention.

Figure 3:
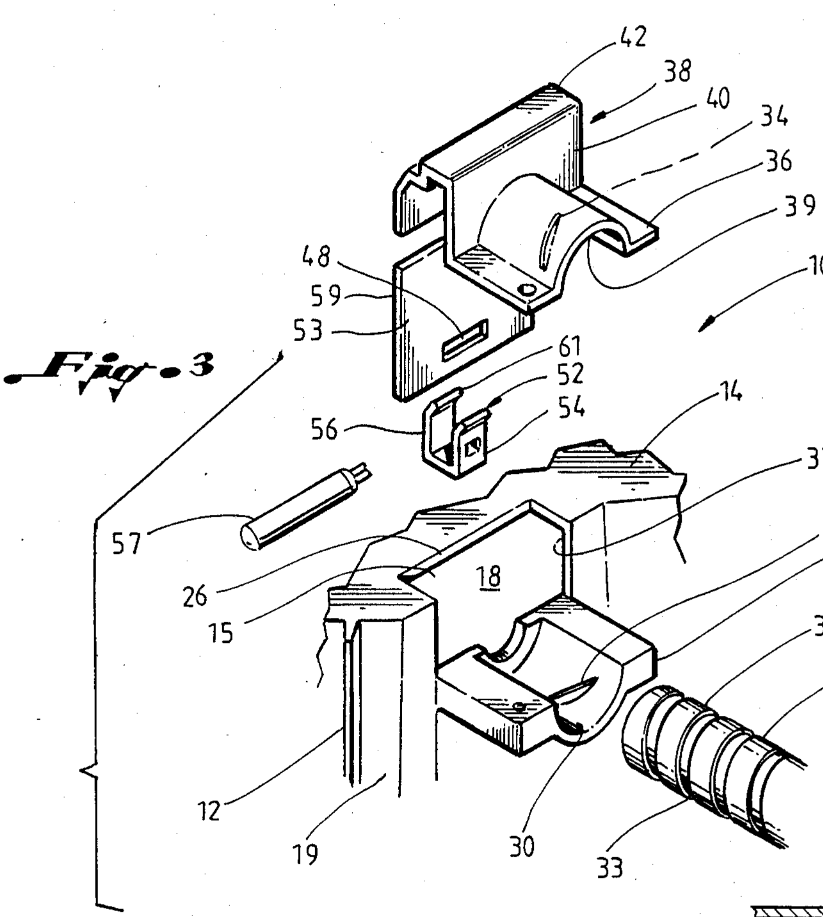
FIG. 3 is an exploded perspective view of the device of the present invention showing details of construction.
Figure 5:
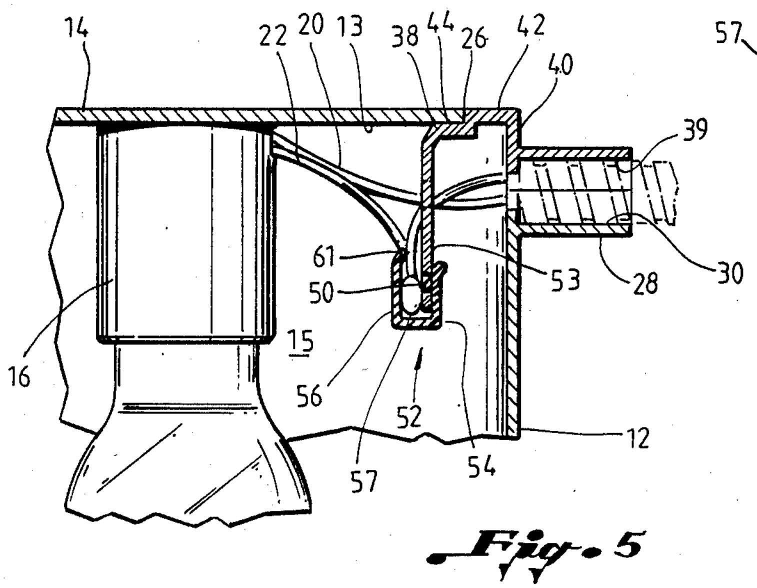
FIG. 5 is a side view in partial section of the device of the present invention.

As shown in FIG. 3 the body of housing 10 is provided with access opening 18 in one portion 19 of peripheral sidewall 12. Opening 18 provides for access to the interior 15 of housing 10 by electrical power leads 20, 22 (FIG. 5). In the preferred embodiment of the invention, access hole 18 is located where sidewall 12 joins closed end 14. Access opening 18 may be either square or rectangular thus defining edge 26 on closed end 14 along one side of opening 18. The utility of edge 26 is discussed below.

Conduit mounting flange 28 defines the bottom of first portion of a clamp for mounting electrical conduit 31. Flange 28 is provided on sidewall 12 of housing 10 at the bottom of access opening 18. Flange 28 is further defined as being positioned opposite edge 26 across opening 18 and extending substantially perpendicular from the exterior of sidewall 12. Conduit mounting flange 28 includes a semi-circular-shaped mounting surface 30 which is sized to receive thereagainst one end of conduit 31. It is contemplated that a flexible BX-type conduit 31 will be attached to housing 10, therefore, a first diagonally oriented projection 32 may be provided on surface 30 of flange 28 against which conduit 31 is engaged. While diagonally oriented projection 32 is shown in the preferred embodiment it is not required for operation of the invention. Projection 32 is configured and oriented to be received within low portions 33 of thread 35 of BX-type conduit 31. In addition thread 35 cooperates with a similar second projection 34 provided on surface 39 of horizontal portion 36 of bracket member 38. Projections 32 and 34 cooperate to threadably receive conduit 31 between conduit mounting flange 28 and bracket member 38.

Bracket member 38, referred to above, is a stamped, one-piece, generally upside-down L-shaped member having a first or horizontal leg 36 defining the semicircular-shaped second surface 39 of the clamping mechanism for holding conduit 31. Second or vertical leg 40 of bracket member 38 further extends from first leg 36 into interior 15 of housing 10 and is positioned in a substantially parallel, spaced-apart relationship from inner surface 37 of sidewall 12. Second or vertical leg 40 is also configured to fit into opening 18 so that it engages closed end 14. Specifically, an enlongated flange-like raised portion 42 and a shoulder 44 are formed by bends in leg 40. Bracket 38 is positioned within access opening 18 such that first leg 36 is engaged against conduit 31 and also secured to conduit mounting flange 28 with threaded fastener 46. Raised portion 42 is received into that portion of opening 18 which extends into closed end 14. In this position shoulder 44 is in surface contact with surface 13 as shown in FIG. 5. The structure described retains and positions bracket member 38 with respect to housing 10 and also provides for fast and simple positioning and retention of conduit 31 to housing 10.

Figure 4:
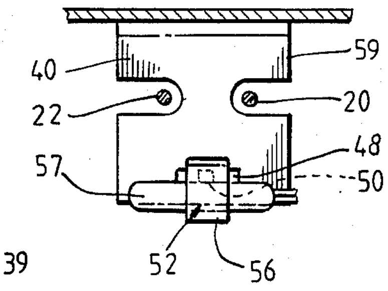
FIG. 4 is a side elevational view in partial section looking from imaginary line 4—4 of FIG. 1.

Referring to FIGS. 3 and 4, second leg 40 of bracket member 38 is provided with cut-out 48 on one end which is configured to receive barb portion 50 of U-shaped spring clip 52. Clip 52 includes first leg 54 which is positioned against outermost surfaces 53 of bracket leg 40. Barb portion 50 of clip 52 is received within cut-out 48 and second leg 56 of clip 52 is positioned to reset against thermal protective device 57. Clip 52 is resilient and thereby holds thermal protective device 57 against innermost surface 59 of bracket leg 40. Further retention of thermal protective device 57 is provided by bent end portion 61 of second leg 56.

Figure 6:
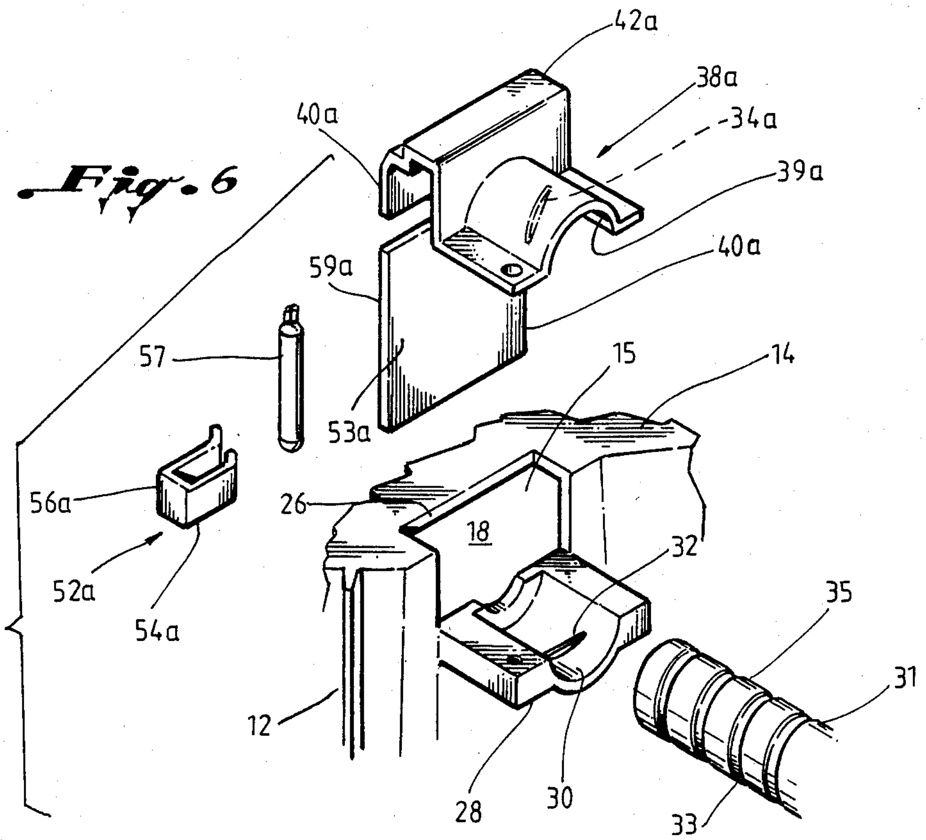
FIG. 6 is an exploded perspective view of an alternate embodiment of the device of the present invention.
Figure 7:
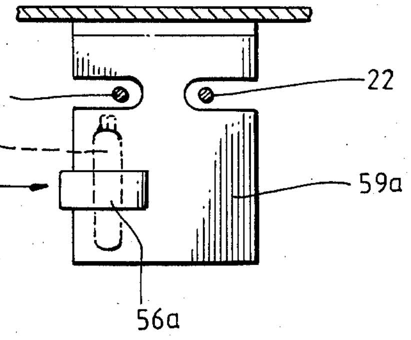
FIG. 7 is a view similar to FIG. 4 of the embodiment shown in FIG. 6.
Figure 8:
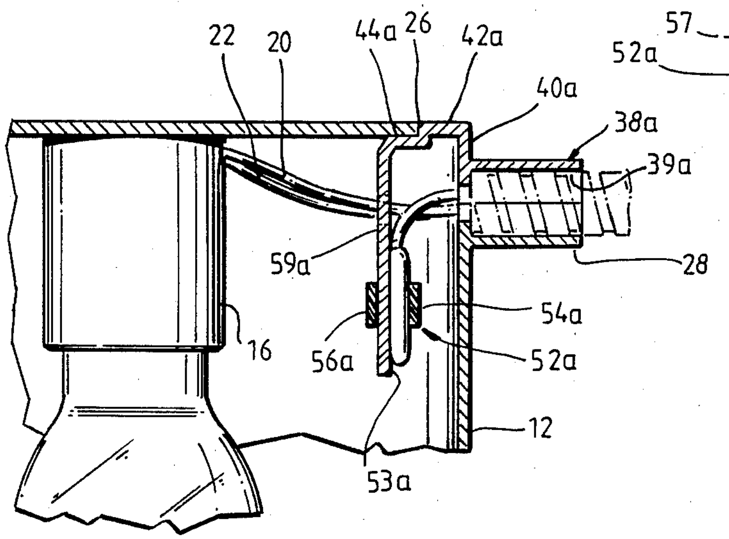
FIG. 8 is a view similar to FIG. 5 of the embodiment shown in FIG. 6.

An alternative design of bracket member **38*a* is shown in FIGS. 6–8 wherein second leg 40*a* of bracket member 38*a* is elongated. Parts having the same function and relative location as in the preferred embodiment have been identified with the suffix "a". Spring clip 52*a* is positioned such that first leg 54*a* of clip 52*a* holds thermal protective device 57 in the same manner as described in connection with the embodiment shown in FIG. 3 except thermal protection device 57 is positioned on the outside of bracket member 38*a***.

In FIGS. 3–5 thermal protective device 57 is positioned transverse to the longitudinal axis of socket 16, while in the embodiment of FIGS. 5–7, thermal protective device 57 is oriented generally parallel to the longitudinal axis of socket 16. In either case, thermal protective device 57 is electrically coupled in series with lamp socket 16 and will cause the electrical circuit to open when a predetermined level of heat is sensed.

A lamp holder housing 10 constructed according to the principles of the present invention provides a simplified, cost effective structure for attaching an electrical conduit without the use of extraneous hardware. Additionally, the lamp holder housing 10 of this invention also provides for the mounting of a thermal protective device 57 within the interior of the housing 10 in close proximity to the housing sidewall 12 without the use of special access holes, mounting brackets or hardware.

Having now described the preferred embodiment of the invention, those skilled in the art having the benefit of the description and the accompanying drawings may readily devise other embodiments and modifications. Such other embodiments and modifications are to be considered within the scope of the appended claims.

What is claimed is:

1. A lamp holder housing for use with flexible conduit, said lamp holder housing comprising:

a body having a peripheral sidewall, a closed end and an open end defining a hollow interior, said closed end adapted to mount a lamp socket, said body further including an access opening into said interior;

flange means extending externally from said peripheral sidewall proximate said access opening defining a first portion of a clamp for receiving the flexible conduit thereagainst;

bracket means defining a second portion of said clamp adapted to co-operate with said first flange means for securing said conduit to said body between said flange means and second portions, said bracket means further defining means extending through said access opening from said second portion into said hollow interior of said body in a predetermined spaced apart relationship with said sidewall, for mounting a thermal protective device adjacent said sidewall.

2. The housing as defined in claim 1 wherein:

said access opening is in the sidewall of said body and said bracket means is a generally upside-down L-shaped member having a pair of legs, one of said legs defining said second portion of said clamp and a second of said legs defining said means for mounting said thermal protective device.

3. The lamp holder housing as defined in claim 2 wherein:

the junction of said first and second legs defines means to mechanically engage said body at said access opening for retaining said upside-down L-shaped member to said body.

4. The housing as defined in claim 3 wherein:

said means for retaining said upside-down L-shaped member includes a raised portion at the junction of said first and second legs which engages said body at said access opening.

5. The housing as defined in claim 4 wherein:

said access opening is provided in said sidewall at the junction of said sidewall and said closed end of said body;

said flange means extends outwardly from said sidewall at a location on the periphery of said access opening;

said junction of said first and second legs further defines a shoulder; and said upside-down L-shaped bracket is positioned in said access opening with said raised flange and said shoulder abutting said closed end.

6. The housing as defined in claim 1 further comprising:

clip means for removably attaching said thermal protective device to said bracket means.

7. The housing as defined in claim 5 wherein said clamp includes means for engaging the thread of a BX-type flexible conduit.

8. The housing as defined in claim 7 wherein said flange means and said second portion of said clamp each include a generally semi-circular portion, and a pair of projections, one projection on each semicircular portion sized and oriented to threadably receive the thread of said conduit.

9. A lamp holder housing comprising:

hollow body means for mounting a lamp socket including an access opening in a portion thereof, said body means being a generally cup-shaped member having a closed end and a peripheral sidewall depending from said closed end, said lamp socket mounted to said closed end within said body means, said access opening defined in said closed end said sidewall at the junction therebetween, said sidewall further including a flange extending outwardly therefrom;

clamp means including a first portion defined by said flange extending outwardly from said sidewall of said hollow body means at said access opening configured to receive a conduit thereagainst and a second portion defined by one part of a bracket configured to receive said conduit, said second portion of said clamp adapted to cooperate with said flange to secure said conduit to said body means, said bracket further including a second part extending through said access opening into said body in spaced apart relationship with the interior surface of said body means; and means for mounting a thermal protection device thereto between said second part of said bracket and the interior surface of said body means.

10. The housing as defined in claim 9 wherein said bracket is substantially formed as an upside-down L with said one part thereof defining a generally semicircular-shaped surface configured to engage said conduit and further including an up-standing, raised portion formed at the junction of said first portion and said second portion receivable in that portion of said access opening contained in said closed end.

11. The housing as defined in claim 10 further comprising:

fastener means for fastening said bracket first portion to said flange.

12. The housing as defined in claim 10 further comprising a pair of projections one on each of said bracket first portion and said flange semi-circular shaped surface said projections configured to threadably receive a threaded BX-type flexible conduit.

13. The housing as defined in claim 10 further comprising:

spring clip means for fastening said thermal protective device to said bracket second portion between said second portion and said sidewall.

14. The housing as defined in claim 13 wherein said spring clip means comprises:

a cut out in said bracket second portion;

a generally U-shaped spring clip received in said cut out with one leg thereof engaged against a surface of said bracket second portion and a second leg thereof resiliently retaining said thermal protective device against said second portion.

15. A lamp holder housing having thermal protection comprising:

a generally cup-shaped body open on one end, closed on a second end and having a peripheral sidewall depending from said closed end said body including an access hole at the junction of said closed end and said sidewall and a flange extending from said sidewall at said access hole configured to receive a portion of a conduit thereagainst;

a bracket including a first portion configured to engage and hold said conduit against said flange, a second portion extending from said first portion and extending into said body in a substantially spaced apart relationship with said sidewall, a raised portion at the junction of said first portion and said second portion of said bracket received in said access opening; and means for retaining said thermal protective device to said bracket second portion between said second portion and said sidewall.

* * * * *